United States Patent
Fujii

[11] 3,862,794
[45] Jan. 28, 1975

[54] LARGE-APERTURE RATIO RETROFOCUS LENS SYSTEM

[75] Inventor: Toru Fujii, Tokyo, Japan
[73] Assignee: Olympus Optical Co., Ltd., Tokyo-to, Japan
[22] Filed: Jan. 18, 1973
[21] Appl. No.: 324,567

[30] Foreign Application Priority Data
Jan. 26, 1972 Japan.............................. 47-9015
Aug. 17, 1972 Japan............................ 47-81802

[52] U.S. Cl. ............................................... 350/214
[51] Int. Cl. ............................................... G02b 9/00
[58] Field of Search .................................. 350/214

[56] References Cited
UNITED STATES PATENTS
3,635,546   1/1972   Mori ................................ 350/214
3,736,049   5/1973   Shimizu .......................... 350/214

Primary Examiner—William L. Sikes
Assistant Examiner—Conrad Clark
Attorney, Agent, or Firm—Cushman, Darby & Cushman

[57] ABSTRACT

The present invention relates to photographic lens systems and more particularly, to a large-aperture wide-angle retrofocus lens system with a field angle about 76° and aperture ratio F:2. The lens system of the present invention comprises a front and rear lens groups; said front lens group being arranged by three lenses, i.e., a positive meniscus lens and two negative meniscus lenses, in order to as far as possible minimize the positive spherical aberration caused by the front lens group and said rear lens group including a cemented lens with a cemented surface having a strong positive power to correct the above-mentioned positive spherical aberration.

7 Claims, 9 Drawing Figures

.

LARGE-APERTURE RATIO RETROFOCUS LENS SYSTEM

FIELD OF THE INVENTION

The present invention relates to a large-aperture ratio wide-angle retrofocus lens system for a single-lens reflex camera.

DESCRIPTION OF THE PRIOR ART

In wide-angle retrofocus lens systems, the power of the front negative lens group becomes stronger when the field angle becomes larger as it is necessary to make the back focal length longer. When the aperture ratio is large, the positive spherical aberration and asymmetry of the offaxial coma caused by the front negative lens group become large and it become difficult to correct them. A wide-angle retrofocus lens systems with a field angle about 76° generally incorporates, as its front negative lens group, a lens system consisting of two lenses, i.e., a convex lens and concave lens. In such lens arrangement, however, the positive spherical aberration caused at the rear surface of the concave lens is large and cannot be satisfactorily corrected by the rear lens group. Therefore, it has been impossible to use such lens system as a large-aperture ratio lens system with F:2.0. The aperture ratio of such lens system has been F:3.5 at most.

SUMMARY OF THE INVENTION

It is an object of the present invention to provide a large-aperture ratio retrofocus photographic lens system for which the above-mentioned disadvantages are eliminated and for which the field angle is about 76° and the aperture ratio is F:2.0.

In the present invention, arrangement is made to provide a large-aperture ratio retrofocus lens system as follows. That is, the concave lens in the front negative lens group is divided into two lenses. Besides, in the rear lens group, a cemented lens having a cemented surface with a strong positive power is arranged on the front side in order to as far as possible minimize the positive spherical aberration caused by the front negative lens group. Furthermore, by using the above-mentioned correcting means, the negative distortion is also prevented. In the following, the content of the present invention is described in further detail according to the illustrated embodiments.

DESCRIPTION OF THE PREFERRED EMBODIMENTS

Figure 1:
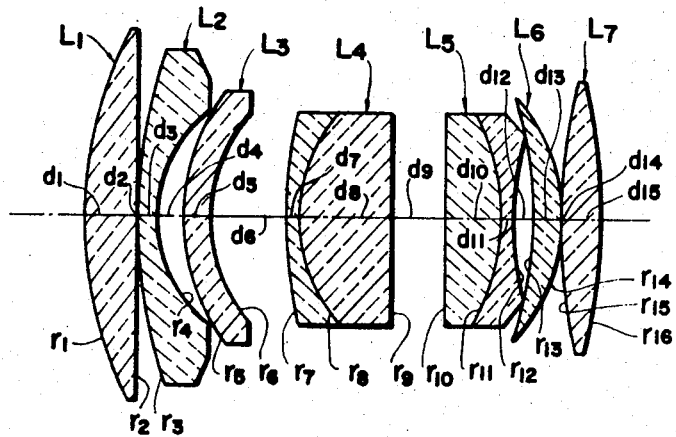
FIG. 1 through FIG. 4 show sectional views of various embodiments of the present invention.
Figure 2:
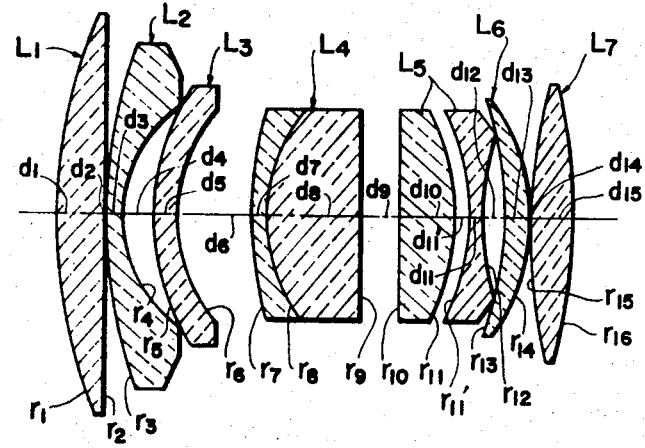
Figure 3:
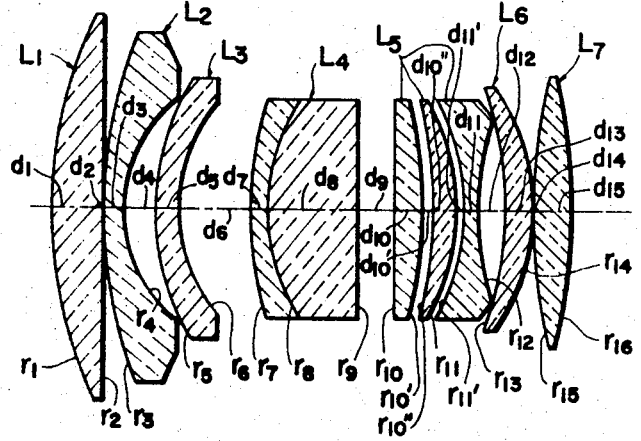

As shown in the above-mentioned figures, the lens system according to the present invention comprises two lens groups; one is a front negative lens group consisting of three lenses, i.e., a positive meniscus lens $L_1$ with its convex surface positioned on the object side and negative meniscus lenses $L_2$ and $L_3$ with their convex surfaces on the object side, and the other is a rear positive lens group consisting of four lenses, i.e., a cemented convex lens $L_4$, negative lens $L_5$, positive meniscus lens $L_6$ with its convex surface on the image side and biconvex lens $L_7$. In this lens system, the negative lens $L_5$ can be arranged in various forms having the same substantial action. The lens $L_5$ shown in FIG. 1 is arranged as a cemented lens, the lens $L_5$ shown in FIG. 2 is divided at the cemented surface shown in FIG. 1, the lens $L_5$ shown in FIG. 3 is arranged by further dividing the convex lens on the front side into two convex lenses, and for the lens $L_5$ shown in FIG. 4, the convex and concave lenses shown in FIG. 3 are cemented to form a cemented concave lens, thus the lens $L_5$ comprises a convex lens and a cemented concave lens.

In the lens system of the present invention as illustrated above, the positive spherical aberration caused in the front negative lens group is minimized and the back focal length is made long by composing the concave lens in the front negative lens group by two concave lenses and by arranging so that the total focal length $f_{123}$ of the front negative lens group satisfies the following condition where the focal length of the whole lens system is designated $f$.

$$0.8f < |f_{123}| < 2.0f \quad (1)$$

If the total focal length $f_{123}$ of the front negative lens group is not in the range of the above condition (1), i.e., when $|f_{123}|$ is smaller than $0.8f$, the positive spherical aberration and astigmatism become too large and it becomes difficult to correct these aberrations by the rear lens group. When $|f_{123}|$ is larger than $2.0f$, it is difficult to make the back focal length long, or if the back focal length is made long, the overall length of the whole lens system has to be made long. In the rear positive lens group, the lens $L_4$ is arranged as a cemented lens and its cemented surface $r_8$ is arranged to have a strong positive power in order to correct the positive spherical aberration and astigmatism caused by the front negative lens group. For this purpose, the cemented surface $r_8$ is positioned near the front negative lens group in order to make the above-mentioned correction more effective and, at the same time, the value of $r_8$ is selected to satisfy the following conditions (2) and (3).

$$1.0/f < 1/r_8 < 2.0/f \quad (2)$$

$$n_5 - n_4 > 0.1 \quad (3)$$

If $1/r_8$ is smaller than $1.0/f$, the positive power at the surface $r_8$ becomes too weak to obtain the above-mentioned correcting effect satisfactorily. If $1/r_8$ is larger than $2.0/f$, the coma especially the "chromatic aberration of coma" (coma caused by difference of wavelengths) near the center of the field becomes large. Besides, when the difference between the refractive index $n_4$ of the front lens and refractive index $n_5$ of the rear lens of the above-mentioned cemented lens $L_4$ is larger than 0.1 as defined by the above condition (3), correction by the positive power of the surface $r_8$ becomes satisfactorily effective even if the value $r_8$ is at the lower limit of the above condition (2). In this kind of retrofocus lens systems modified triplet type lenses are often used as rear positive lens groups. As the negative lens $L_5$ in the rear positive lens group has a tendency of overcorrection for the upper ray and undercorrection for the lower ray, it is effective for eliminating asymmetry of the coma. For this purpose, in the lens system of the present invention, which satisfies the afore-mentioned conditions (1), (2) and (3), the power $f_5$ of the negative lens $L_5$ is selected to satisfy the following condition.

$$2.5f < |f_5| < 4.5f \qquad (4)$$

If the value $f_5$ is smaller than $2.5f$, the undercorrection of the spherical aberration increases and it becomes impossible to make the zonal aberration of the whole lens system small. If the value $f_5$ exceeds $4.5f$, asymmetry of the coma cannot be corrected and the astigmatism increases. Besides, when the negative lens $L_5$ is arranged as shown in FIG. 4 (as illustrated by the embodiments 4 and 5 described later), it is effective also for correcting the offaxial curvature of the field provided that the power $f_5'$ of the front lens element $L_5'$ of the lens $L_5$ is selected to satisfy the following condition.

$$1.5f < |f_5'| < 2.5f \qquad (5)$$

For the lens system according to the present invention which satisfies the above-mentioned conditions, aberrations are corrected quite favourably. Provided that said lens system further satisfies conditions as described below, it is more favourable for correction of various aberrations.

Figure 4:
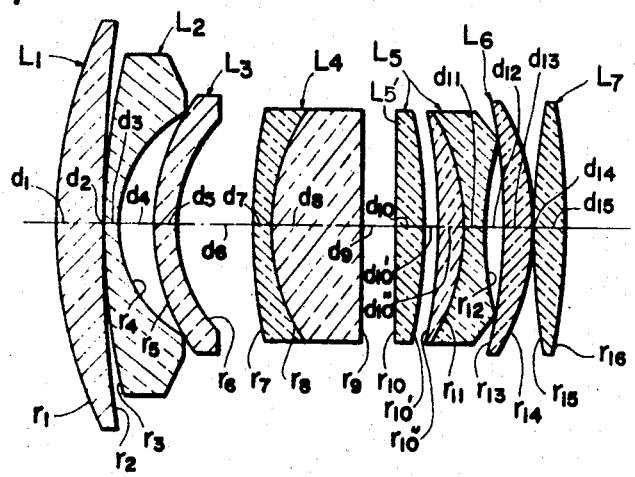

First, when the thickness of the lens $L_4$ is designated $D_4$ and that of the lens $L_5$ is designated $D_5$ (the thickness $D_5$ of the lens $L_5$ represents the sum of thicknesses of all lens elements composing the lens $L_5$, i.e., $D_5$ represents $d_{10} + d_{11}$ in lens systems shown in FIGS. 1 and 2 and $d_{10} + d_{10}'' + d_{11}$ in the lens systems shown in FIGS. 3 and 4), it is more desirable to select $D_4$ and $D_5$ to satisfy the following condition in order to correct various aberrations, especially the astigmatism and curvature of the field.

$$0.4f < D_4 + D_5 < 0.8f \qquad (6)$$

Besides, when the thickness $D_4$ i.e., $d_7 + d_8$ of the lens $L_4$ is selected to satisfy the following condition, it is effective for improvement of the sine condition and of the "chromatic aberration of coma" in the range of smaller field angles.

$$0.3f < d_7 + d_8 < 0.5f \qquad (7)$$

Besides, the fact to provide a surface having a negative radius of curvature in the negative lens $L_5$ is effective for reducing the flare caused by the sagittal ray and, therefore, for eliminating the flare caused by the offaxial ray which tends to occur in large-aperture ratio retrofocus lens systems. Especially, said correction becomes more effective when the surface $r_{11}$ satisfies the following condition.

$$-1.0/f > 1/r_{11} > -1.6/f \qquad (8)$$

Furthermore, in the lens system according to the present invention, two lenses $L_6$ and $L_7$ which are arranged at positions on the image end are taking important role, in addition to the afore-mentioned positive power of the cemented surface $r_8$ of the cemented lens $L_4$, for correction of various aberrations caused by the front negative lens group. Especially, the negative spherical aberration caused by these lenses $L_6$ and $L_7$ serves to cancel the positive spherical aberration caused by the front negative lens group. Besides, to make these lenses $L_6$ and $L_7$ correct the curvature of the field, their refractive indexes $n_8$ and $n_9$ are both selected at values exceeding 1.65. Besides, the fact to use a biconvex lens as the lens $L_7$ and to make its surface $r_{15}$ on the object side satisfy the following condition is effective for correction of asymmetry of the coma in addition to the above-mentioned correction of the spherical aberration.

$$1/r_{15} < 0.6/f \qquad (9)$$

Furthermore, to correct the chromatic aberration of the whole lens system, dispersion of lenses $L_1$, $L_2$ and $L_3$ in the front lens group and that of lenses $L_6$ and $L_7$ in the rear lens group are minimized as far as possible. When Abbe's numbers of the above lenses are respectively designated $\nu_1$, $\nu_2$, $\nu_3$, $\nu_8$ and $\nu_9$, it is effective to select them as given in the following conditions for correcting the chromatic aberration especially.

$$\nu_1, \nu_8, \nu_9 > 50 \qquad (10)$$

$$\nu_2, \nu_3 > 60 \qquad (11)$$

Respective embodiments of the present invention as described in detail in the above are shown by numerical data in tables below, wherein reference symbols $r_1$ through $r_{16}$ designate radii of curvature of respective lens surfaces, reference symbols $d_1$ through $d_{15}$ designate thicknesses of respective lenses and spaces between lenses, reference symbols $n_1$ through $n_9$ represent refractive indexes of respective lenses and reference symbols $\nu_1$ through $\nu_9$ represent Abbe's numbers of respective lenses.

Figure 5:
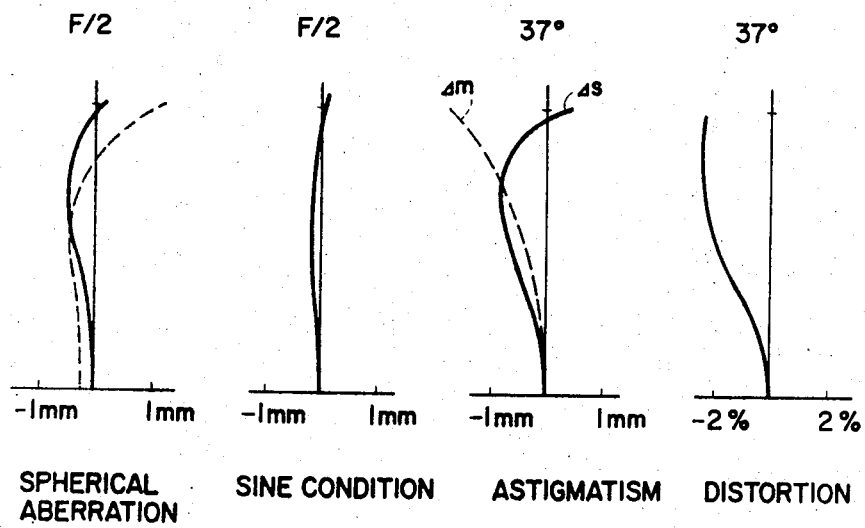
FIG. 5 through FIG. 9 show graphs illustrating conditions of aberrations of the above-mentioned embodiments.

Table 1 gives numerical data of the embodiment 1 of the present invention as shown in FIG. 1 for which curves of various aberrations are shown in FIG. 5.

Table 1

| F:2.0 | | $f=100$ | |
|---|---|---|---|
| $r_1=146.803$ | | | |
| | $d_1=15.86$ | $n_1=1.64$ | $\nu_1=60.3$ |
| $r_2=637.795$ | | | |
| | $d_2=0.53$ | | |
| $r_3=193.755$ | | | |
| | $d_3=5.20$ | $n_2=1.50378$ | $\nu_2=66.8$ |
| $r_4=44.149$ | | | |
| | $d_4=13.02$ | | |
| $r_5=81.596$ | | | |
| | $d_5=7.11$ | $n_3=1.50378$ | $\nu_3=66.8$ |
| $r_6=54.975$ | | | |
| | $d_6=27.48$ | | |

Table 1-Continued

| | | | |
|---|---|---|---|
| $r_7=306.164$ | | | |
| | $d_7=3.51$ | $n_4=1.50378$ | $\nu_4=66.8$ |
| $r_8=67.153$ | | | |
| | $d_8=31.31$ | $n_5=1.72$ | $\nu_5=43.7$ |
| $r_9=-6140.173$ | | | |
| | $d_9=17.07$ | | |
| $r_{10}=897.850$ | | | |
| | $d_{10}=21.51$ | $n_6=1.79952$ | $\nu_6=42.3$ |
| $r_{11}=-72.551$ | | | |
| | $d_{11}=3.64$ | $n_7=1.76182$ | $\nu_7=26.6$ |
| $r_{12}=177.680$ | | | |
| | $d_{12}=6.73$ | | |
| $r_{13}=-159.677$ | | | |
| | $d_{13}=10.47$ | $n_8=1.6968$ | $\nu_8=55.6$ |
| $r_{14}=-71.340$ | | | |
| | $d_{14}=0.53$ | | |
| $r_{15}=238.752$ | | | |
| | $d_{15}=10.71$ | $n_9=1.6968$ | $\nu_9=55.6$ |
| $r_{16}=-267.319$ | | | |

Figure 6:
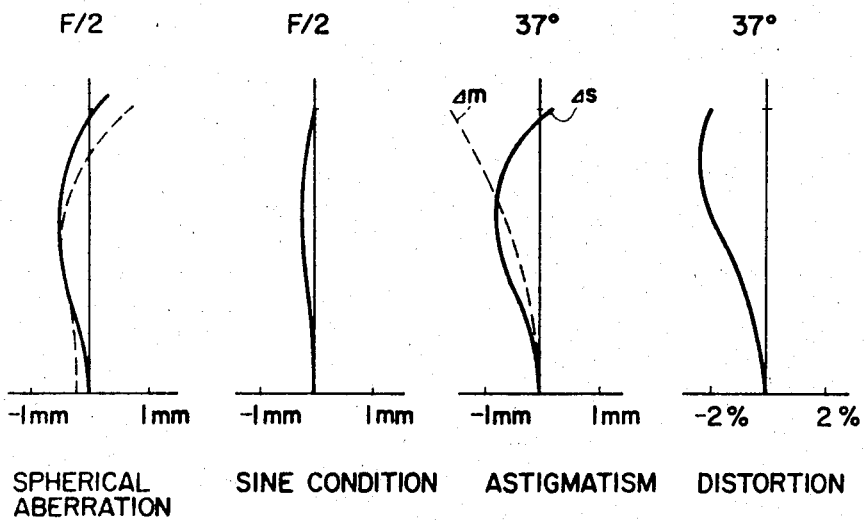

Table 2 gives numerical data of the embodiment 2 of the present invention as shown in FIG. 2 for which curves of various aberrations are shown in FIG. 6.

Table 2

| F:2.0 | $f=100$ | | |
|---|---|---|---|
| $r_1=152.802$ | | | |
| | $d_1=15.74$ | $n_1=1.64$ | $\nu_1=60.3$ |
| $r_2=651.702$ | | | |
| | $d_2=0.53$ | | |
| $r_3=184.493$ | | | |
| | $d_3=5.0$ | $n_2=1.50378$ | $\nu_2=66.8$ |
| $r_4=43.128$ | | | |
| | $d_4=13.30$ | | |
| $r_5=80.507$ | | | |
| | $d_5=7.31$ | $n_3=1.50378$ | $\nu_3=66.8$ |
| $r_6=55.504$ | | | |
| | $d_6=27.73$ | | |
| $r_7=329.365$ | | | |
| | $d_7=3.72$ | $n_4=1.50378$ | $\nu_4=66.8$ |
| $r_8=67.631$ | | | |
| | $d_8=31.60$ | $n_5=1.72$ | $\nu_5=46.0$ |
| $r_9=\infty$ | | | |
| | $d_9=13.76$ | | |
| $r_{10}=3194.398$ | | | |
| | $d_{10}=21.77$ | $n_6=1.788$ | $\nu_6=47.5$ |
| $r_{11}=-82.032$ | | | |
| $r_{11}'=-75.997$ | $d_{11}'=4.58$ | | |
| | $d_{11}=3.79$ | $n_7=1.76182$ | $\nu_7=26.6$ |
| $r_{12}=223.486$ | | | |
| | $d_{12}=6.63$ | | |
| $r_{13}=-233.989$ | | | |
| | $d_{13}=10.43$ | $n_8=1.6968$ | $\nu_8=55.6$ |
| $r_{14}=-74.255$ | | | |
| | $d_{14}=0.53$ | | |
| $r_{15}=447.901$ | | | |
| | $d_{15}=10.64$ | $n_9=1.6968$ | $\nu_9=55.6$ |
| $r_{16}=-187.702$ | | | |

Figure 7:
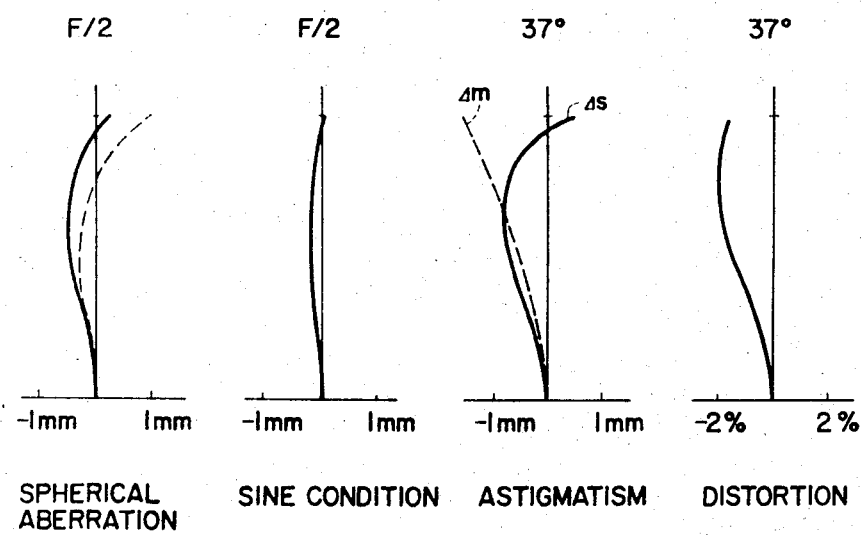

Table 3 gives numerical data of the embodiment 3 of the present invention as shown in FIG. 3 for which curves of various aberrations are shown in FIG. 7.

Table 3

| F:2.0 | $f=100$ | | |
|---|---|---|---|
| $r_1=157.566$ | | | |
| | $d_1=15.96$ | $n_1=1.64$ | $\nu_1=60.3$ |
| $r_2=654.146$ | | | |
| | $d_2=0.53$ | | |
| $r_3=188.794$ | | | |
| | $d_3=5.32$ | $n_2=1.50378$ | $\nu_2=66.8$ |
| $r_4=44.349$ | | | |
| | $d_4=13.12$ | | |
| $r_5=82.517$ | | | |
| | $d_5=7.09$ | $n_3=1.50378$ | $\nu_3=66.8$ |
| $r_6=54.835$ | | | |
| | $d_6=27.66$ | | |
| $r_7=344.510$ | | | |
| | $d_7=4.26$ | $n_4=1.50378$ | $\nu_4=66.8$ |
| $r_8=66.529$ | | | |
| | $d_8=26.84$ | $n_5=1.717$ | $\nu_5=47.9$ |
| $r_9=\infty$ | | | |

Table 3-Continued

| | | | |
|---|---|---|---|
| | $d_9=15.60$ | | |
| $r_{10}=948.861$ | | | |
| | $d_{10}=8.83$ | $n_6=1.804$ | $\nu_6=46.7$ |
| $r_{10}'=-253.902$ | | | |
| | $d_{10}'=4.61$ | | |
| $r_{10}''=-203.200$ | | | |
| | $d_{10}''=8.83$ | $n_6'=1.79952$ | $\nu_6'=42.3$ |
| $r_{11}=-85.330$ | | | |
| | $d_{11}'=4.29$ | | |
| $r_{11}'=-80.400$ | | | |
| | $d_{11}=4.26$ | $n_7=1.78472$ | $\nu_7=25.7$ |
| $r_{12}=221.811$ | | | |
| | $d_{12}=5.74$ | | |
| $r_{13}=-225.692$ | | | |
| | $d_{13}=10.64$ | $n_8=1.6968$ | $\nu_8=55.6$ |
| $r_{14}=-74.759$ | | | |
| | $d_{14}=0.53$ | | |
| $r_{15}=457.678$ | | | |
| | $d_{15}=12.41$ | $n_9=1.6968$ | $\nu_9=55.6$ |
| $r_{16}=-161.676$ | | | |

Figure 8:
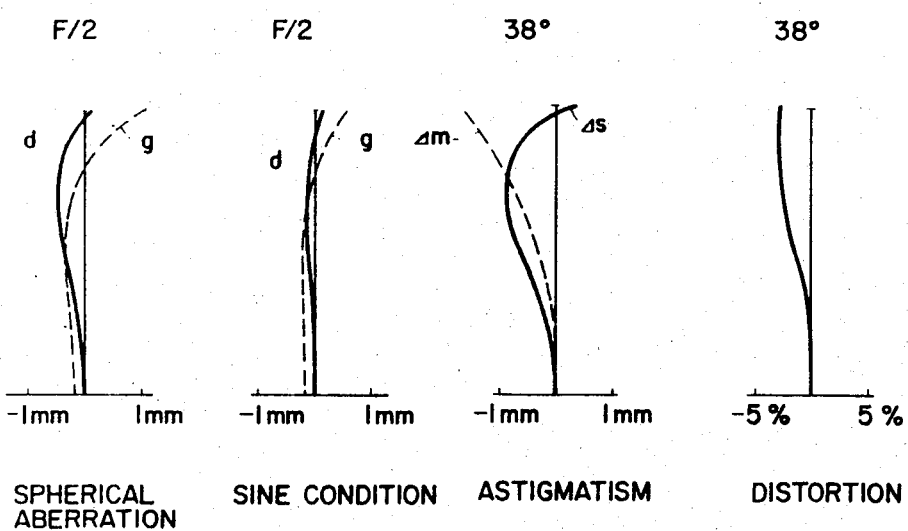

Table 4 gives numerical data of the embodiment 4 of the present invention as shown in FIG. 4 for which curves of various aberrations are shown in FIG. 8.

Table 4

| F:2.0 | $f=100$ | | |
|---|---|---|---|
| $r_1=151.207$ | | | |
| | $d_1=16.07$ | $n_1=1.64$ | $\nu_1=60.25$ |
| $r_2=636.157$ | | | |
| | $d_2=0.54$ | | |
| $r_3=202.764$ | | | |
| | $d_3=5.36$ | $n_2=1.50378$ | $\nu_2=66.81$ |
| $r_4=45.236$ | | | |
| | $d_4=13.21$ | | |
| $r_5=82.382$ | | | |
| | $d_5=7.14$ | $n_3=1.50378$ | $\nu_3=66.81$ |
| $r_6=56.343$ | | | |
| | $d_6=27.86$ | | |
| $r_7=361.204$ | | | |
| | $d_7=3.57$ | $n_4=1.50378$ | $\nu_4=66.81$ |
| $r_8=65.501$ | | | |
| | $d_8=31.43$ | $n_5=1.72$ | $\nu_5=43.7$ |
| $r_9=\infty$ | | | |
| | $d_9=12.43$ | | |
| $r_{10}=668.575$ | | | |
| | $d_{10}=10.71$ | $n_6=1.803$ | $\nu_6=46.66$ |
| $r_{10}'=-237.318$ | | | |
| | $d_{10}'=4.68$ | | |
| $r_{10}''=-180.039$ | | | |
| | $d_{10}''=10.71$ | $n_6'=1.79952$ | $\nu_6'=42.28$ |
| $r_{11}=-71.889$ | | | |
| | $d_{11}=3.57$ | $n_7=1.76182$ | $\nu_7=26.55$ |
| $r_{12}=187.582$ | | | |
| | $d_{12}=6.86$ | | |
| $r_{13}=-191.364$ | | | |
| | $d_{13}=10.71$ | $n_8=1.6968$ | $\nu_8=56.51$ |
| $r_{14}=-78.004$ | | | |
| | $d_{14}=0.54$ | | |
| $r_{15}=341.861$ | | | |
| | $d_{15}=12.5$ | $n_9=1.6968$ | $\nu_9=56.51$ |
| $r_{16}=-166.150$ | | | |

Figure 9:
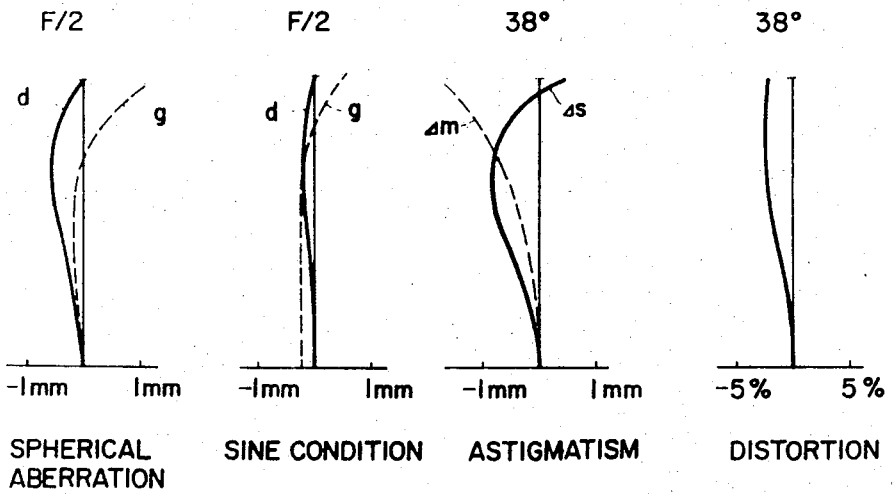

Table 5 gives numerical data of the embodiment 5 of the present invention as shown in FIG. 4 for which curves of various aberrations are shown in FIG. 9.

Table 5

| F:2.0 | | | $f=100$ |
|---|---|---|---|
| $r_1=144.988$ | | | |
| | $d_1=21.43$ | $n_1=1.67$ | $\nu_1=57.33$ |
| $r_2=506.589$ | | | |
| | $d_2=0.54$ | | |
| $r_3=189.399$ | | | |
| | $d_3=5.49$ | $n_2=1.51633$ | $\nu_2=64.15$ |
| $r_4=47.830$ | | | |
| | $d_4=13.26$ | | |
| $r_5=83.589$ | | | |
| | $d_5=5.06$ | $n_3=1.618$ | $\nu_3=63.38$ |
| $r_6=56.580$ | | | |
| | $d_6=29.87$ | | |
| $r_7=400.062$ | | | |
| | $d_7=4.89$ | $n_4=1.50378$ | $\nu_4=66.81$ |

Table 5-Continued

| | | | |
|---|---|---|---|
| $r_8=68.782$ | | | |
| | $d_8=32.54$ | $n_5=1.7$ | $\nu_5=48.08$ |
| $r_9=-13723.579$ | | | |
| | $d_9=10.86$ | | |
| $r_{10}=571.194$ | | | |
| | $d_{10}=18.51$ | $n_6=1.7859$ | $\nu_6=44.24$ |
| $r_{10}'=-221.409$ | | | |
| | $d_{10}'=4.80$ | | |
| $r_{10}''=-185.577$ | | | |
| | $d_{10}''=15.53$ | $n_6'=1.8061$ | $\nu_6'=40.8$ |
| $r_{11}=-72.443$ | | | |
| | $d_{11}=4.41$ | $n_7=1.76182$ | $\nu_7=26.55$ |
| $r_{12}=184.138$ | | | |
| | $d_{12}=8.49$ | | |
| $r_{13}=-194.800$ | | | |
| | $d_{13}=10.92$ | $n_8=1.6968$ | $\nu_8=55.62$ |
| $r_{14}=-84.600$ | | | |
| | $d_{14}=0.43$ | | |
| $r_{15}=273.484$ | | | |
| | $d_{15}=12.48$ | $n_9=1.6968$ | $\nu_9=55.62$ |
| $r_{16}=-165.053$ | | | |

From the above-mentioned figures showing curves of aberrations, it is evident that the present invention provides a large-aperture retrofocus lens system for which various aberrations are corrected quite favourably.

I claim:

1. A large-aperture ratio retrofocus lens system comprising a front negative lens group consisting of three lenses, i.e., a first lens, second lens and third lens, and a rear positive lens group consisting of four components, i.e., a fourth component, fifth component, sixth lens and seventh lens, where, in said front negative lens group, said first lens is a positive meniscus lens with its convex surface on the object side and said second and third lenses are negative meniscus lenses with their convex surfaces on the object side and where, in said rear positive lens group, said fourth component is a positive cemented component, said fifth component has a negative refractive power, said sixth lens is a positive meniscus lens with its convex surface on the image side and said seventh lens is a positive biconvex lens, and said lens system satisfying the following conditions wherein reference symbol $f_{123}$ represents the total focal length of said first, second and third lenses, reference symbol $r_8$ represents the radius of curvature of the cemented surface of said fourth component, reference symbol $f_5$ represents the focal length of said fifth component, reference symbol $n_4$ represents the refractive index of the front lens element of said fourth component and reference symbol $n_5$ represents the refractive index of the rear lens of said fourth component:

$1.2f < |f_{123}| < 1.4f$
$1.4/f < 1/r_8 < 1.6/f$
$n_5 - n_4 > 0.1$
$3.1f < |f_5| < 3.6f$.

2. A large-aperture ratio retrofocus lens system comprising a front negative lens group consisting of three lenses, i.e., a first lens, second lens and third lens, and a rear positive lens group consisting of four components, i.e., a fourth component, fifth component, sixth lens and seventh lens, where, in said front negative lens group, said first lens is a positive meniscus lens with its convex surface on the object side, said second and third lenses are negative meniscus lenses with their convex surfaces on the object side and where, in said rear positive lens group, said fourth component is a positive cemented component, said fifth component is a negative component consisting of a positive lens element and negative cemented lens element, said sixth lens is a positive meniscus lens with its convex surface on the image side and said seventh lens is a biconvex lens, and said lens system satisfying the following conditions wherein reference symbol $f_{123}$ represents the total focal length of said first, second and third lenses, reference symbol $r_8$ represents the radius of curvature of the cemented surface of said fourth component, reference symbol $f_5$ represents the focal length of said fifth component and reference symbol $f_5'$ represents the focal length of said positive lens element included in said fifth component, reference symbol $n_4$ represents the refractive index of the front lens element of said fourth component and reference symbol $n_5$ represents the refractive index of the rear lens of said fourth component:

$1.2f < |f_{123}| < 1.4f$
$1.4/f < 1/r_8 < 1.6/f$
$n_5 - n_4 > 0.1$
$3.1f < |f_5| < 3.6f$
$2.0f < |f_5'| < 2.2f$.

3. A large-aperture ratio retrofocus lens system comprising a front negative lens group consisting of three lenses, i.e., a first lens, second lens and third lens, and a rear positive lens group consisting of four components, i.e., a fourth component, fifth component, sixth lens and seventh lens, where, in said front negative lens group, said first lens is a positive meniscus lens with its convex surface on the object side and said second and third lenses are negative meniscus lenses with their convex surfaces on the object side and where, in said rear positive lens group, said fourth component is a positive cemented component, said fifth component is a negative cemented component, said sixth lens is a positive meniscus lens with its convex surface on the image side and said seventh lens is a positive biconvex lens, and said lens system having numerical data as given below:

Table 1

| F:2.0 | | $f=100$ | |
|---|---|---|---|
| $r_1=146.803$ | | | |
| | $d_1=15.86$ | $n_1=1.64$ | $\nu_1=60.3$ |
| $r_2=637.795$ | | | |
| | $d_2=0.53$ | | |
| $r_3=193.755$ | | | |
| | $d_3=5.20$ | $n_2=1.50378$ | $\nu_2=66.8$ |
| $r_4=44.149$ | | | |
| | $d_4=13.02$ | | |
| $r_5=81.596$ | | | |
| | $d_5=7.11$ | $n_3=1.50378$ | $\nu_3=66.8$ |
| $r_6=54.975$ | | | |
| | $d_6=27.48$ | | |
| $r_7=306.164$ | | | |
| | $d_7=3.51$ | $n_4=1.50378$ | $\nu_4=66.8$ |
| $r_8=67.153$ | | | |
| | $d_8=31.31$ | $n_5=1.72$ | $\nu_5=43.7$ |
| $r_9=-6140.173$ | | | |
| | $d_9=17.07$ | | |
| $r_{10}=-897.850$ | | | |
| | $d_{10}=21.51$ | $n_6=1.79952$ | $\nu_6=42.3$ |
| $r_{11}=-72.551$ | | | |
| | $d_{11}=3.64$ | $n_7=1.76182$ | $\nu_7=26.6$ |
| $r_{12}=177.680$ | | | |
| | $d_{12}=6.73$ | | |
| $r_{13}=-159.677$ | | | |
| | $d_{13}=10.47$ | $n_8=1.6968$ | $\nu_8=55.6$ |
| $r_{14}=-71.340$ | | | |
| | $d_{14}=0.53$ | | |
| $r_{15}=238.752$ | | | |
| | $d_{15}=10.71$ | $n_9=1.6968$ | $\nu_9=55.6$ |
| $r_{16}=-267.319$ | | | | wherein reference symbols $r_1$ through $r_{16}$ represent radii of curvature of respective lens surfaces, reference symbols $d_1$ through $d_{15}$ represent thicknesses of respective lenses and spaces between lenses, reference symbols $n_1$ through $n_9$ represent refractive indexes of respective lenses and reference symbols $\nu_1$ through $\nu_9$ represent Abbe's numbers of respective lenses.

4. A large-aperture ratio retrofocus lens system comprising a front negative lens group consisting of three lenses, i.e., a first lens, second lens and third lens, a rear positive lens group consisting of four components, i.e., a fourth component, fifth component, sixth lens and seventh lens, where, in said front negative lens group, said first lens is a positive meniscus lens with its convex surface on the object side and said second and third lenses are negative meniscus lenses with their convex surfaces on the object side and where, in said rear positive lens group, said fourth component is a positive cemented component, said fifth component is a negative component comprising a positive lens element and a negative lens element, said sixth lens is a positive meniscus lens with its convex surface on the image side and said seventh lens is a positive biconvex lens, and said lens system having numerical data as given below:

```
        F:2.0              f=100
r₁=152.802
           d₁=15.74    n₁=1.64       ν₁=60.3
r₂=651.702
           d₂=0.53
r₃=184.493
           d₃=5.0      n₂=1.50378    ν₂=66.8
r₄=43.128
           d₄=13.30
r₅=80.507
           d₅=7.31     n₃=1.50378    ν₃=66.8
r₆=55.504
           d₆=27.73
r₇=329.365
           d₇=3.72     n₄=1.50378    ν₄=66.8
r₈=67.631
           d₈=31.60    n₅=1.72       ν₅=46.0
r₉=∞
           d₉=13.76
r₁₀=3194.398
           d₁₀=21.77   n₆=1.788      ν₆=47.5
r₁₁=−82.032
           d₁₁'=4.58
r₁₁'=−75.997
           d₁₁=3.79    n₇=1.76182    ν₇=26.6
r₁₂=223.486
           d₁₂=6.63
r₁₃=−233.989
           d₁₃=10.43   n₈=1.6968     ν₈=55.6
r₁₄=−74.255
           d₁₄=0.53
r₁₅=447.901
           d₁₅=10.64   n₉=1.6968     ν₉=55.6
r₁₆=−187.702
``` wherein reference symbols $r_1$ through $r_{16}$ represent radii of curvature of respective lens surfaces, reference symbols $d_1$ through $d_{15}$ represent thicknesses of respective lenses and spaces between lenses, reference symbols $n_1$ through $n_9$ represent refractive indexes of respective lenses and reference symbols $\nu_1$ through $\nu_9$ represent Abbe's numbers of respective lenses.

5. A large-aperture ratio retrofocus lens system comprising a front negative lens group consisting of three lenses, i.e., a first lens, second lens and third lens, and a rear positive lens group consisting of four components, i.e., a fourth component, fifth component, sixth lens and seventh lens, where, in said front negative lens group, said firstt lens is a positive meniscus lens with its convex surface on the subject side, said second and third lenses are negative meniscus lenses with their convex surfaces on the object side and where, in said rear positive lens group, said fourth component is a positive cemented component, said fifth component is a negative component consisting of two positive lens elements and a negative lens element, said sixth lens is a positive meniscus lens with its convex surface on the image side and said seventh lens is a biconvex lens, and said lens system having numerical data as given below:

Table 3

```
        F:2.0              f=100
r₁=157.566
           d₁=15.96    n₁=1.64        ν₁=60.3
r₂=654.146
           d₂=0.53
r₃=188.794
           d₃=5.32     n₂=1.50378     ν₂=66.8
r₄=44.349
           d₄=13.12
r₅=82.517
           d₅=7.09     n₃=1.50378     ν₃=66.8
r₆=54.835
           d₆=27.66
r₇=344.510
           d₇=4.26     n₄=1.50378     ν₄=66.8
r₈=66.529
           d₈=26.84    n₅=1.717       ν₅=47.9
r₉=∞
           d₉=15.60
r₁₀=948.861
           d₁₀=8.83    n₆=1.804       ν₆=46.7
r₁₀'=−253.902
           d₁₀'=4.61
r₁₀''=−203.200
           d₁₀''=8.83  n₆'=1.79952    ν₆'=42.3
r₁₁=−85.330
           d₁₁'=4.29
r₁₁'=−80.400
           d₁₁=4.26    n₇=1.78472     ν₇=25.7
r₁₂=221.811
           d₁₂=5.74
r₁₃=−225.692
           d₁₃=10.64   n₈=1.6968      ν₈=55.6
r₁₄=−74.759
           d₁₄=0.53
r₁₅=457.678
           d₁₅=12.41   n₉=1.6968      ν₉=55.6
r₁₆=−161.676
``` wherein reference symbols $r_1$ through $r_{16}$ represent radii of curvature of respective lens surfaces, reference symbols $d_1$ through $d_{15}$ represent thicknesses of respective lenses and spaces between lenses, reference symbols $n_1$ through $n_9$ represent refractive indexes of respective lenses and reference symbols $\nu_1$ through $\nu_9$ represent Abbe's numbers of respective lenses.

6. A large-aperture ratio retrofocus lens system comprising a front negative lens group consisting of three lenses, i.e., a first lens, second lens and third lens, and a rear positive lens group consisting of four components, i.e., a fourth component, fifth component, sixth lens and seventh lens, where, in said front negative lens group, said first lens is a positive meniscus lens with its convex surface on the object side, said second and third lenses are negative meniscus lenses with their convex surfaces on the object side and where, in said rear positive lens group, said fourth component is a positive cemented component, said fifth component is a negative component consisting of a positive lens element and negative cemented lens element, said sixth lens is a positive meniscus lens with its convex surface on the image side and said seventh lens is a biconvex lens and said lens system having numerical data as given below:

Table 4

```
        F:2.0              f=100
r₁=151.207
           d₁=16.07    n₁=1.64       ν₁=60.25
r₂=636.157
```

Table 4-Continued

| | | | |
|---|---|---|---|
| $r_3=202.764$ | $d_2=0.54$ | | |
| $r_4=45.236$ | $d_3=5.36$ | $n_2=1.50378$ | $\nu_2=66.81$ |
| $r_5=82.382$ | $d_4=13.21$ | | |
| $r_6=56.343$ | $d_5=7.14$ | $n_3=1.50378$ | $\nu_3=66.81$ |
| $r_7=361.204$ | $d_6=27.86$ | | |
| $r_8=65.501$ | $d_7=3.57$ | $n_4=1.50378$ | $\nu_4=66.81$ |
| $r_9=\infty$ | $d_8=31.43$ | $n_5=1.72$ | $\nu_5=43.7$ |
| $r_{10}=668.575$ | $d_9=12.43$ | | |
| $r_{10}'=-237.318$ | $d_{10}=10.71$ | $n_6=1.803$ | $\nu_6=46.66$ |
| $r_{10}''=-180.039$ | $d_{10}'=4.68$ | | |
| $r_{11}=-71.889$ | $d_{10}''=10.71$ | $n_6'=1.79952$ | $\nu_6'=42.28$ |
| $r_{12}=187.582$ | $d_{11}=3.57$ | $n_7=1.76182$ | $\nu_7=26.55$ |
| $r_{13}=-191.364$ | $d_{12}=6.86$ | | |
| $r_{14}=-78.004$ | $d_{13}=10.71$ | $n_8=1.6968$ | $\nu_8=56.51$ |
| $r_{15}=341.861$ | $d_{14}=0.54$ | | |
| $r_{16}=-166.150$ | $d_{15}=12.5$ | $n_9=1.6968$ | $\nu_9=56.51$ | wherein reference symbols $r_1$ through $r_{16}$ represent radii of curvature of respective lens surfaces, reference symbols $d_1$ through $d_{15}$ represent thicknesses of respective lenses and spaces between lenses, reference symbols $n_1$ through $n_9$ represent refractive indexes of respective lenses and reference symbols $\nu_1$ through $\nu_9$ represent Abbe's numbers of respective lenses.

7. A large-aperture ratio retrofocus lens system comprising a front negative lens group consisting of three lenses, i.e., a first lens, second lens and third lens, and a rear positive lens group consisting of four components, i.e., a fourth component, fifth component, sixth lens and seventh lens, where, in said front negative lens group, said first lens is a positive meniscus lens with its convex surface on the object side, said second and third lenses are negative meniscus lenses with their convex surfaces on the object side and where, in said rear positive lens group, said fourth component is a positive cemented component, said fifth component is a negative component consisting of a positive lens element and negative cemented lens element, said sixth lens is a positive meniscus lens with its convex surface on the image side and said seventh lens is a biconvex lens, and said lens system having numerical data as given below:

Table 5

| F:2.0 | | $f=100$ | |
|---|---|---|---|
| $r_1=144.988$ | $d_1=21.43$ | $n_1=1.67$ | $\nu_1=57.33$ |
| $r_2=506.589$ | $d_2=0.54$ | | |
| $r_3=189.399$ | $d_3=5.49$ | $n_2=1.51633$ | $\nu_2=64.15$ |
| $r_4=47.830$ | $d_4=13.26$ | | |
| $r_5=83.589$ | $d_5=5.06$ | $n_3=1.618$ | $\nu_3=63.38$ |
| $r_6=56.580$ | $d_6=29.87$ | | |
| $r_7=400.062$ | $d_7=4.89$ | $n_4=1.50378$ | $\nu_4=66.81$ |
| $r_8=68.782$ | $d_8=32.54$ | $n_5=1.7$ | $\nu_5=48.08$ |
| $r_9=-13723.579$ | $d_9=10.86$ | | |
| $r_{10}=571.194$ | $d_{10}=18.51$ | $n_6=1.7859$ | $\nu_6=44.24$ |
| $r_{10}'=-221.409$ | $d_{10}'=4.80$ | | |
| $r_{10}''=-185.577$ | $d_{10}''=15.53$ | $n_6'=1.8061$ | $\nu_6'=40.8$ |
| $r_{11}=-72.443$ | $d_{11}=4.41$ | $n_7=1.76182$ | $\nu_7=26.55$ |
| $r_{12}=184.138$ | $d_{12}=3.49$ | | |
| $r_{13}=-194.800$ | $d_{13}=10.92$ | $n_8=1.6968$ | $\nu_8=55.62$ |
| $r_{14}=-84.600$ | $d_{14}=0.43$ | | |
| $r_{15}=273.484$ | $d_{15}=12.48$ | $n_9=1.6968$ | $\nu_9=55.62$ |
| $r_{16}=-165.053$ | | | | wherein reference symbols $r_1$ through $r_{16}$ represent radii of curvature of respective lens surfaces, reference symbols $d_1$ through $d_{15}$ represent thicknesses of respective lenses and spaces between lenses, reference symbols $n_1$ through $n_9$ represent refractive indexes of respective lenses an reference symbols $\nu_1$ through $\nu_9$ represent Abbe's numbers of respective lenses.

* * * * *